United States Patent Office 2,974,043
Patented Mar. 7, 1961

2,974,043
POULTRY FEED

Melvin Hochberg and Charles M. Ely, Livingston, N.J., and Howard C. Klein, Brooklyn, N.Y., assignors to Nopco Chemical Company, Harrison, N.J., a corporation of New Jersey
No Drawing. Filed Oct. 31, 1958, Ser. No. 770,944
19 Claims. (Cl. 99—4)

The present invention relates to improvements in the feeding of domesticated animals such as poultry, swine and cattle. More particularly the present invention relates to animal feeds having incorporated therein zinc nicotinate.

It is known to incorporate niacin, a dietary essential for domesticated animals into their feed rations. However, we have unexpectedly discovered that zinc nicotinate is far more effective than niacin for achieving optimum rate of growth of these animals where niacin has been so used before. The following example, which is not to be construed in a limiting manner, demonstrates the unexpected superiority of zinc nicotinate when used in conjunction with a feed ration.

Example

Nine lots of chickens, each lot containing sixteen day-old Hubbard New Hamshire cockerel chicks, were fed from one day of age to 28 days of age under a carefully controlled environment, each lot being housed in multi-deck wire batteries and each lot being provided with the same amount of floor space and the same physical equipment.

One of the lots of chicks served as the control lot and was fed a niacin deficient basal diet. This diet is a modification of a diet developed at the University of Wisconsin by M. F. Sunde (Poultry Science, vol. 34, p. 305, 1955). The reason for the modification of the diet is to improve palatability of the feed and to assure satisfactory intake by the chicks. The composition is as follows:

Formula for basal diet: Lbs./cwt.
Ground yellow corn _____ 30.36
Sucrose _____ 31.80
Gelatin _____ 16.64
Casein _____ 9.00
Soybean oil _____ 5.00
Tricalcium phosphate _____ 3.07
Ground limestone _____ 1.40
Sodium chloride _____ 0.78
Trace minerals[1] _____ 0.40
Vitamin supplements[2] _____ 1.55
  Total _____ 100.00

[1] The trace minerals consisted of:
Lbs./cwt.
Magnesium sulfate _____ 0.230
Ferric citrate _____ 0.130
Potassium iodide _____ 0.004
Zinc chloride _____ 0.011
Manganese oxide _____ 0.012
Copper sulfate _____ 0.013
  Total _____ 0.400

[2] The vitamin supplements consisted of:
Gms.
dl Methionine _____ 136.0
70% choline chloride _____ 129.0
Vitamin A (30,000 units/gm.) _____ 7.71
Vitamin D₃ (30,000 units/gm.) _____ 4.19
Procaine penicillin _____ 5.0
Thiamine hydrochloride _____ 1.5
Riboflavin _____ 3.0
dl calcium pantothenate _____ 21.98
Pyridoxine hydrochloride _____ 2.0
Biotin _____ 0.1
Inositol _____ 227.0
Paraminobenzoic acid _____ 50.0
dl Alpha tocopherol acetate _____ 1.5
Folic acid _____ 1.0
B₁₂ concentrate (20 mg./lb.) _____ 113.5
  Total _____ 703.48
  (1.55 lbs.)

It should be noted that the basal diet, although deficient in niacin, contains about 4 mg. per pound of niacin present in the ground yellow corn.

Four lots of the chicks were fed the same niacin deficient basal diet to which was added U.S.P. niacin in 5, 10, 20 and 200 mg. quantities per pound of air dried diet respectively. The remaining four lots of chicks were fed the same niacin deficient basal diet to which was added zinc nicotinate in quantities such that the resulting niacin content of the zinc nicotinate was present in 5, 10, 20 and 200 mg. quantities per pound of air dried diet respectively. The zinc nicotinate which was added had an assay value of 74% by weight of niacin based on the chemical analysis of the zinc nicotinate. All nine lots of chicks were then fed for 28 days under identical conditions. The average gain in weight of the chicks in each lot at the end of the feeding period is given in the following table. The percent response over negative control was calculated from the following:

$$\frac{\text{wt. after 4 wks.} - \text{wt. of control}}{\text{wt. of control}} \times 100$$

| Basal diet plus additive | Level of added niacin, mg./lb. | 4 wk. gain, gms. | Percent response over negative control | Percent increased response from zinc nicotinate |
|---|---|---|---|---|
| Basal diet only (negative control) | 0 | 50.5 | | |
| USP Niacin | 5 | 108.7 | 115 | |
| Zinc Nicotinate | 5 | 118.8 | 136 | +21 |
| USP Niacin | 10 | 128.8 | 155 | |
| Zinc Nicotinate | 10 | 130.0 | 158 | +3 |
| USP Niacin | 20 | 110.7 | 119 | |
| Zinc Nicotinate | 20 | 120.3 | 138 | +19 |
| USP Niacin | 200 | 98.9 | 96 | |
| Zinc Nicotinate | 200 | 112.0 | 122 | +26 |
| Av. increased response from zinc nicotinate | | | | 17.2) |

As the foregoing data indicate, feed rations containing zinc nicotinate brought about an unexpected increase in rate of growth when compared with feed rations containing niacin. Moreover even at the 10 mg. per pound level where there appears to be a maximum gain from niacin, the zinc nicotinate (containing equivalent amounts of niacin) still brings about an increased gain over the niacin. Where there appears to be a lessening in rate of growth due to niacin (see 20 and 200 mg./lb. levels) the results from zinc nicotinate still demonstrate an unexpected improvement. Furthermore, since the zinc level of the basal feed was 24 mg. per pound and exceeded the recognized requirement level of 15 to 20 mg. per pound, the extra growth appears to be due to an unexplained synergism between zinc and niacin which favorably affects the rate of growth in the desired manner throughout the whole range of the zinc nicotinate addition.

When zinc nicotinate is used in commercial feeds, it may be present in amounts from about 0.5 to 200 mg. per pound, calculated as niacin, based on the air dry weight of the feed. Zinc nicotinate may be introduced into the commercial feed by first blending with the other vitamin components and subsequently adding the blend to the cereal components.

Although zinc nicotinate is water-insoluble, it may be incorporated into the drinking water consumed by the animals. This may be accomplished by forming a dispersion of the zinc nicotinate in the water by means of a suitable non-toxic dispersing agent. In the case of poultry, the zinc nicotinate should be present in the water in amounts of from about 0.25 to 100 mg. (calculated as niacin) per pint of water since poultry consume approximately twice as much water, on a weight basis, as feed.

Zinc nicotinate may be prepared from niacin as shown in U.S. Patent No. 2,280,040 Seibert et al., issued April 14, 1942.

From the foregoing disclosure it will be recognized that other embodiments or equivalent forms of our invention may be made without departing from the spirit and scope of our invention. Hence, it is understood that we do not limit ourselves to the specific illustrations disclosed above.

Having described our invention, what we claim as new and desire to secure by Letters Patent is:

1. An animal feed comprising a feed ration having incorporated therein zinc nicotinate in growth promoting quantities.
2. A poultry feed comprising a poultry feed ration having incorporated therein zinc nicotinate in growth promoting quantities.
3. An animal feed comprising a feed ration having incorporated therein from about 0.5 to 200 mg. of zinc nicotinate, calculated as niacin, per pound of said ration based on the air dry weight of said ration.
4. A poultry feed comprising a poultry feed ration having incorporated therein from about 0.5 to 200 mg. of zinc nicotinate, calculated as niacin, per pound of said ration based on the air dry weight of said ration.
5. A poultry feed comprising a poultry feed ration having incorporated therein about 5 mg. of zinc nicotinate, calculated as niacin, per pound of said ration based on the air dry weight of said ration.
6. A poultry feed comprising a poultry feed ration having incorporated therein about 10 mg. of zinc nicotinate, calculated as niacin, per pound of said ration based on the air dry weight of said ration.
7. A poultry feed comprising a poultry feed ration having incorporated therein about 20 mg. of zinc nicotinate, calculated as niacin, per pound of said ration based on the air dry weight of said ration.
8. A poultry feed comprising a poultry feed ration having incorporated therein about 200 mg. of zinc nicotinate, calculated as niacin, per pound of said ration based on the air dry weight of said ration.
9. An aqeous dispersion, for ingestion by animals, comprising water, zinc nicotinate in growth promoting quantities and a dispersing agent therefor.
10. An aqueous dispersion, for ingestion by poultry, comprising water, zinc nicotinate in growth promoting quantities and a dispersing agent therefor.
11. An aqueous dispersion, for ingestion by poultry, comprising water, zinc nicotinate and a dispersing agent therefor, said zinc nicotinate being present in an amount of 0.25 to 100 mg., calculated as niacin, per pint of water.
12. A process for maintaining optimum rate of growth of animals which comprises incorporating zinc nicotinate in growth promoting quantities in an animal feed ration.
13. A process for maintaining optimum rate of growth of poultry which comprises incorporating zinc nicotinate in growth promoting quantities into a poultry feed ration.
14. A process for maintaining optimum rate of growth of animals which comprises incorporating into an animal feed ration from about 0.5 to 200 mg. of zinc nicotinate, calculated as niacin, per pound of said ration based on the air dry weight of said ration.
15. A process for maintaining optimum rate of growth of poultry which comprises incorporating into a poultry feed ration from about 0.5 to 200 mg. of zinc nicotinate, calculated as niacin, per pound of said ration based on the air dry weight of said ration.
16. A process for maintaining optimum rate of growth of poultry which comprises incorporating into a poultry feed ration about 5 mg. of zinc nicotinate, calculated as niacin, per pound of said ration based on the air dry weight of said ration.
17. A process for maintaining optimum rate of growth of poultry which comprises incorporating into a poultry feed ration about 10 mg. of zinc nicotinate, calculated as niacin, per pound of said ration based on the air dry weight of said ration.
18. A process for maintaining optimum rate of growth of poultry which comprises incorporating into a poultry feed ration about 20 mg. of zinc nicotinate, calculated as niacin, per pound of said ration based on the air dry weight of said ration.
19. A process for maintaining optimum rate of growth of poultry which comprises incorporating into a poultry feed ration about 200 mg. of zinc nicotinate, calculated as niacin, per pound of said ration based on the air dry weight of said ration.

References Cited in the file of this patent

UNITED STATES PATENTS

| | | |
|---|---|---|
| 2,230,616 | Dowzard | Feb. 4, 1941 |
| 2,280,040 | Seibert | Apr. 14, 1942 |
| 2,703,285 | Luther | Mar. 1, 1955 |